Aug. 25, 1959  J. EVASIC  2,901,088
HOPPER FEEDER

Filed June 14, 1957  5 Sheets-Sheet 1

INVENTOR.
JOHN EVASIC
BY
Donnelly, Mentag & Harrington
ATTORNEYS

Aug. 25, 1959  J. EVASIC  2,901,088
HOPPER FEEDER

Filed June 14, 1957  5 Sheets-Sheet 2

INVENTOR.
JOHN EVASIC
BY
Donnelly, Mentag & Harrington
ATTORNEYS

Aug. 25, 1959  J. EVASIC  2,901,088
HOPPER FEEDER
Filed June 14, 1957  5 Sheets-Sheet 4

INVENTOR.
JOHN EVASIC
BY
ATTORNEYS

Aug. 25, 1959     J. EVASIC     2,901,088
HOPPER FEEDER
Filed June 14, 1957     5 Sheets-Sheet 5

INVENTOR.
JOHN EVASIC
BY Donnelly, Mentag & Harrington
ATTORNEYS

United States Patent Office 2,901,088
Patented Aug. 25, 1959

2,901,088
HOPPER FEEDER
John Evasic, Detroit, Mich.
Application June 14, 1957, Serial No. 665,862
14 Claims. (Cl. 198—33)

This invention relates generally to hopper feeding, and, more particularly, to a hopper feeder in which a plurality of individual workpieces are placed in a hopper and from which the workpieces are discharged in series and in a predetermined or orientated position onto a discharge chute.

It is the primary object of the present invention to provide a machine of this class including an inclined apron upon which a random mass of workpieces are deposited and a means for agitating the apron so as to feed the workpieces onto a novel conveying means which is adapted to carry the workpieces to a chute and to discharge the workpieces into the chute so that a predetermined end of each of the workpieces will face downwardly when moving down the chute by gravity.

It is another object of the present invention to provide a machine of this class which will be simple in structure, economical of manufacture, durable, compact, highly efficient in use and easily operated.

It is a further object of the present invention to provide a machine of this class including means for individually feeding workpieces downwardly on a chute onto which the workpieces are deposited.

Other objects will appear hereinafter.

It is recognized that various modifications and changes may be made in the details of the structure illustrated without departing from the invenion, and, it is intended that the present disclosure shall be considered to be but the preferred embodiment.

Forming a part of this application are drawings in which.

Figure 1:
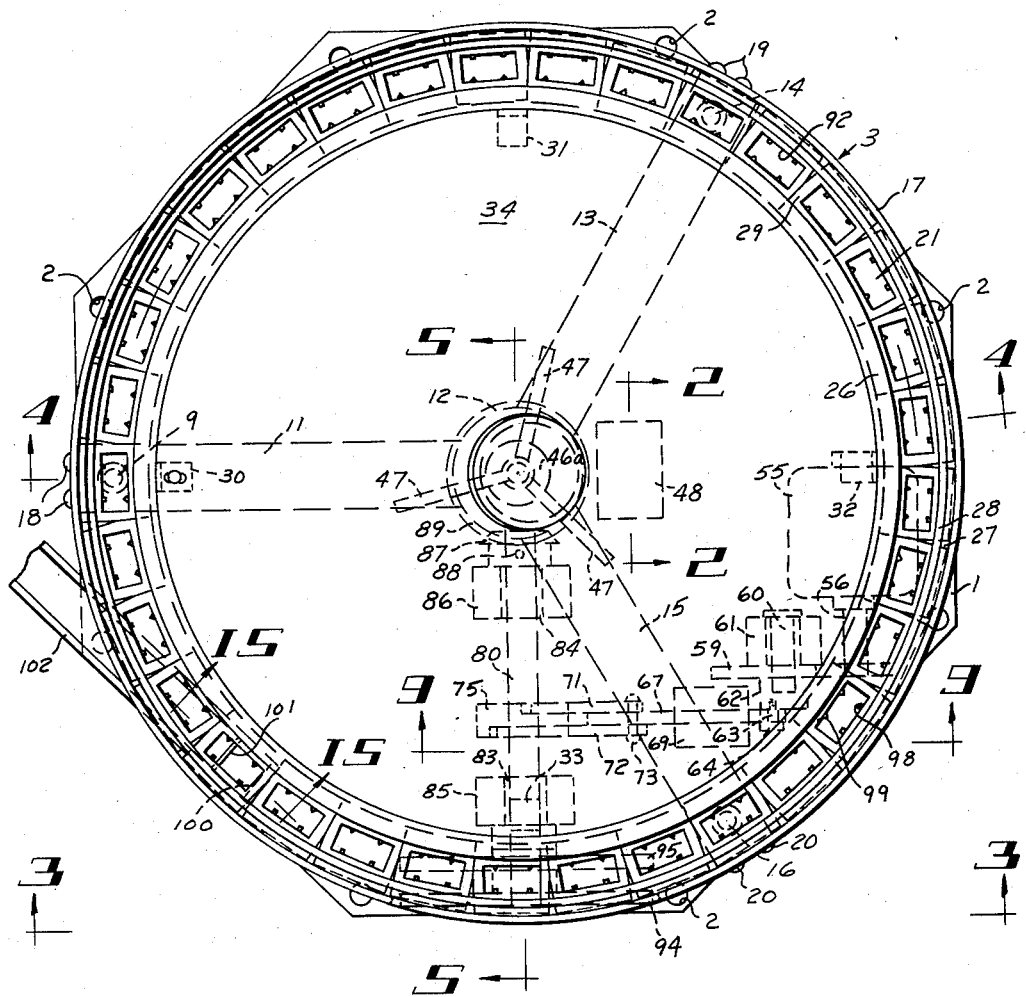
Fig. 1 is a top plan view of a hopper feeder made in accordance with the principles of the invention.
Figure 2:
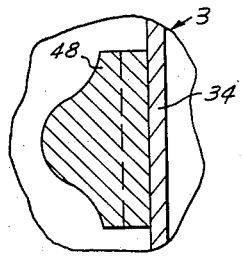
Fig. 2 is an enlarged fragmentary elevational sectional view of the structure illustrated in Fig. 1, taken along the line 2—2 thereof, and looking in the direction of the arrows.
Figure 4:
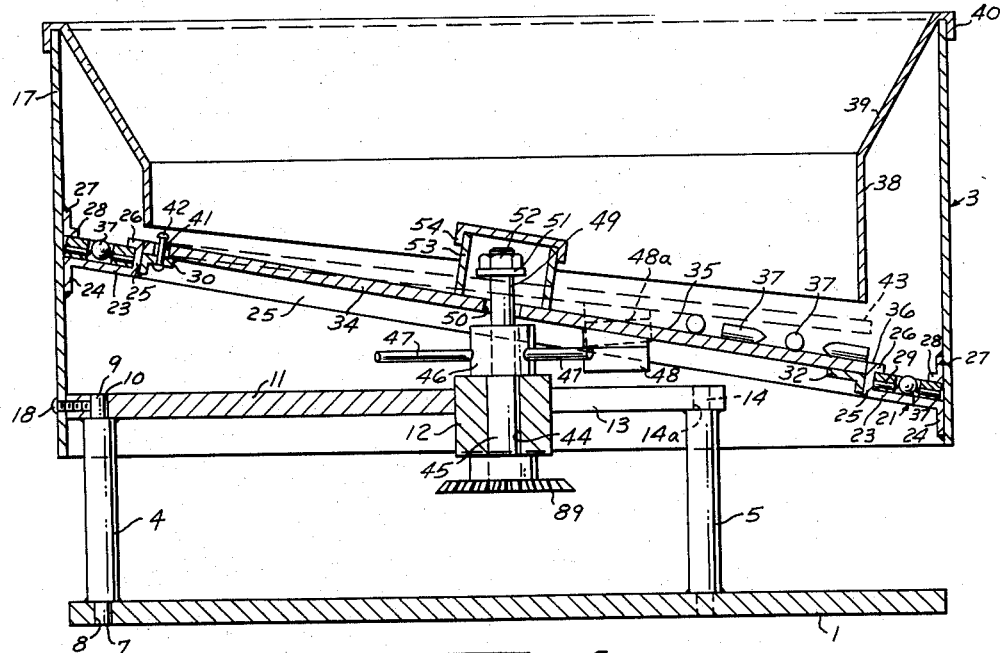
Fig. 4 is an elevational sectional view of the structure illustrated in Fig. 1, taken along the line 4—4 thereof, and looking in the direction of the arrows.
Figure 3:
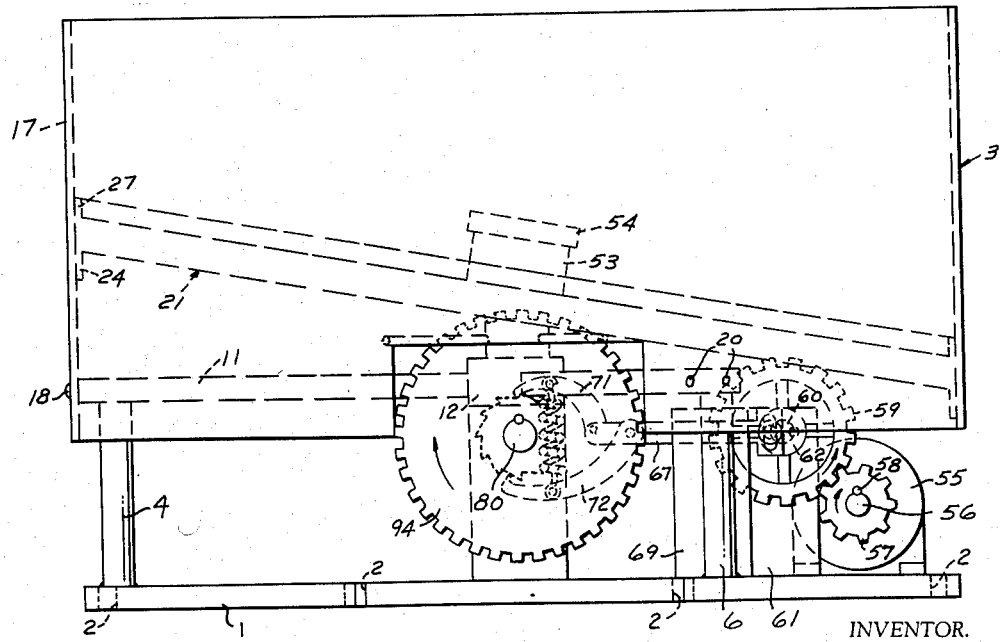
Fig. 3 is a side elevational view of the structure illustrated in Fig. 1, taken along the line 3—3 thereof, and looking in the direction of the arrows.

Referring now to the drawings, and in particular to Figs. 1, 3 and 4 wherein is shown an illustrative embodiment of the invention, the numeral 1 designates a base plate which is provided with a plurality of holes 2 adapted to receive suitable screws or other fastening means for fixedly mounting the base plate 1 on a suitable support. The numeral 3 generally indicates a hopper which is fixedly mounted on the base plate 1 by means of the supporting standards or legs 4, 5 and 6. As shown in Fig. 4, the lower end of the standard 4 is provided with a reduced extension 7 which is adapted to be mounted in a mating hole 8 in the base 1. The standard 4 is further secured to the base 1, as by welding. The standards 5 and 6 are fixedly secured to the base 1 in a manner similar to the standard 4.

As shown in Fig. 4, the upper end of the standard 4 is provided with a reduced extension 9 which is adapted to be mounted in a mating hole 10 in the outer end of a horizontal elongated support bar 11. The standard 4 is further fixed to the support bar 11 as by welding. The inner end of the support bar 11 is fixedly secured to the bearing block 12. The bearing block 12 is further supported by a second horizontal elongated support bar 13 having the inner end thereof fixedly secured to the block 12, as by welding to the inner end.

As shown in Fig. 4, the upper end of standard 5 is provided with a reduced extension 14 which is adapted to be mounted in the hole 14ª in the support bar 13. The standard is further secured to the bar 13 as by welding. The bearing block 12 is further supported by a third horizontal elongated support bar 15 which has the inner end thereof fixedly mounted to the block 12 as by welding. The outer end of the support bar 15 is fixedly mounted on a reduced extension 16 on the upper end of the standard 6 in the same manner as the other support bars 11 and 13 are mounted on the standards 4 and 5. As clearly seen in Fig. 1, the three support bars 11, 13 and 15 form a supporting frame for the hopper 3.

As best seen in Figs. 1, 3 and 4, the hopper 3 includes an annular vertical wall or open ended cylinder 17 which is fixedly secured by means of the screws 18, 19 and 20 to the support bars 11, 13 and 15 respectively. Fixedly mounted on the inner surface of the hopper wall 17 is a conveyor belt means generally designated by the numeral 21. As shown in Figs. 1 and 4, the conveyor belt means 21 is disposed on the inside of the hopper wall 17 in a sloping or slanting arrangement with the high point being disposed on the left side and the low point on the right side of the hopper, as viewed in these figures.

The conveyor belt means 21 includes a track which comprises a substantially horizontal annular plate 23 having the downwardly extended integral leg 24 on the outer periphery thereof, and this leg 24 is fixedly secured to the hopper wall 17 in a suitable manner as by welding. The conveyor track further includes the upwardly extended leg 25 which is integrally formed on the inner periphery of the annular plate 23. Integrally formed on the upper end of the leg 25 is an outwardly extended horizontal lip or flange 26. The conveyor track further comprises the vertical leg 27 which is spaced upwardly from the annular plate 23 and which is fixedly secured to the hopper wall 17 as by welding. The vertical leg 27 is provided with an integral inwardly extended lip or flange 28 on the lower end thereof which is adapted to be parallel with the lip 26 on the leg 25.

The conveyor belt means includes a plurality of conveyor blocks generally designated by the numeral 29 which are slidably mounted in the conveyor track so as to form a continuous circular conveyor belt. The ends of the conveyor blocks are disposed in an end to end abutting relation with each other and function in a manner as is more fully explained hereinafter.

As shown in Figs. 1 and 4, a plurality of evenly spaced apart L-shaped brackets as 30, 31, 32 and 33, are fixedly secured to the outer vertical faces of the track leg 25 as by welding. The aforementioned L-shaped brackets are adapted to support a circular flat apron or disc 34 and in a manner so that the upper surface 35 of the disc will be parallel to the upper surface 36 of the conveyor track inner lip 26 whereby the workpieces as 37 which are deposited on the upper surface 35 of the disc will easily roll onto the conveyor belt means 21 at the low point thereof, as seen in Fig. 4.

The conveyor belt means 21 and the disc 34 are each preferably sloped or slanted at an angle selected from a range of from 5 to 10°.

As shown in Fig. 4, the hopper 3 may be provided with a loading guide funnel having a vertical annular wall 38 which is adapted to be disposed inside of the hopper and to extend downwardly to a point adjacent the disc 34 but spaced from the disc 34 a distance sufficient to permit the workpieces 37 to slide off of the disc 34 and onto the conveyor belt means 21. The loading guide funnel further includes an outwardly tapered annular wall 39 which is integrally connected to the upper end of the vertical wall 38 and which is provided on the upper end thereof with an integrally formed flange as 40 which is adapted to be seated on the upper edge of the hopper wall 17.

As shown in Fig. 4, the disc 34 is adapted to be agitated by the following described structure so as to shake or move the workpieces 37 down the sloping face of the disc onto the conveyor belt means 21. The disc 34 is provided on the higher side thereof with a hole therethrough as 41 which is adapted to receive the pin 42 which is fixedly secured in the supporting L-shaped bracket 30. The pin 42 acts as a pivot means about which the lower side of the disc 34 may be pivoted upwardly to the broken line position shown in Fig. 4 and indicated by the numeral 43.

As best seen in Fig. 4, the bearing block 12 is provided with an axial hole 44 in which is suitably rotatably mounted the shaft 45. Fixedly mounted on the reduced upper end 49 of the shaft 45 by means of the set-screw 46a (Fig. 1) is the hub 46 in which is fixedly mounted a plurality of horizontal radially disposed cam arms 47. As the shaft 45 is rotated by means described hereinafter, the arms 47 are adapted to contact the curved lower face of the cam 48 which is fixedly mounted as by welding on the lower side of the disc 34 and which is disposed in the path of rotation of the arms 47. It will be seen that as the cam arms engage the cam 48 this cam will be moved upwardly to the dotted line position 48a (Fig. 1) whereby the disc 34 will be moved upwardly to the dotted position 43. It will be seen that the aforedescribed structure for actuating the disc 34 upwardly and downwardly provides an agitating means for moving the workpieces 37 down the sloping face 35 of the disc 34 and onto the conveying means 21.

As shown in Fig. 4, the integral reduced shaft extension 49 is adapted to extend upwardly through an axial hole 50 in the disc 34 and this shaft carries a stop member 51 on the upper end thereof which is adapted to be retained on shaft by means of the nut 52. The upper end of the shaft 49 is enclosed by the cylindrical wall 53 which is fixedly mounted on the upper face of the disc 34 as by welding. The cylindrical wall 53 is adapted to be enclosed by the detachable cover 54.

Figure 9:
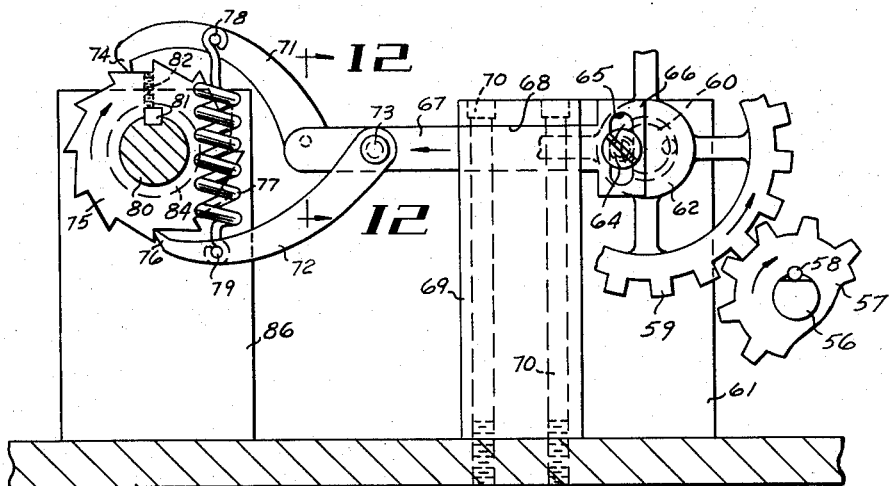
Fig. 9 is a fragmentary elevational view, partly in section, of the ratchet driving mechanism illustrated in Fig. 1, taken along the line 9—9 thereof, looking in the direction of the arrows, and showing the ratchet driving mechanism in a first operative position.
Figure 13:
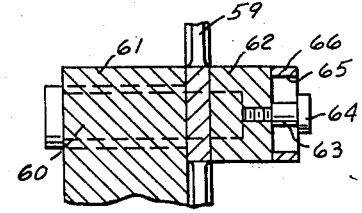
Fig. 13 is a fragmentary elevational sectional view of the structure illustrated in Fig. 10, taken along the line 13—13 thereof, and looking in the direction of the arrows.

The shaft 45 is rotated by the following described structure. As best seen in Figs. 1, 3 and 9, a suitable electric motor as 55 is fixedly mounted on the base 1, in any suitable manner below the disc 34. The motor 55 is provided with the usual output shaft 56 on which is fixedly mounted the drive pinion gear 57 as by means of the lock pin 58. The pinion gear 57 is meshably engaged with and drives the gear 59 which is rotatably mounted on the horizontal shaft 60 which is operatively mounted in the standard 61. The standard 61 is fixedly mounted on the base 1 in any suitable manner, as by welding. As best seen in Figs. 1 and 13, an axial hub 62 is fixedly mounted on the shaft 60 so as to rotate with the gear 59. Threadably mounted in an eccentric manner on the outer face of the hub 62 is a shaft 63 having an outer head 64. The shaft 63 is slidably mounted in the vertical cross slot 65 which is formed in the vertically disposed cross head 66. The cross head 66 is integrally mounted on the outer end of a horizontal ratchet shaft 67 which is slidably mounted in the horizontal hole 68 in the standard 69 which is fixedly mounted on the base 1 by suitable bolts as 70. It will be seen that as the gear 59 rotates the eccentric shaft 63 will be moved upwardly and downwardly in the cross head slot 65 whereby the cross head 66 and the ratchet shaft 67 will be moved forwardly and backwardly along a horizontal path.

As best seen in Figs. 1, 3, 5 and 9, the ratchet shaft 67 is provided on the inner end thereof with two ratchet arms as 71 and 72 which have the outer ends thereof pivotally mounted on the shaft 67 by means of the pin 73. The ratchet arm 71 has the conventional pushing finger 74 formed on the inner end thereof which is adapted to operatively engage the ratchet teeth on the ratchet wheel or gear 75, and rotate or drive the gear 75 in the clockwise direction as shown by the arrow in Fig. 9 when the ratchet shaft 67 is moved inwardly. The ratchet arm 72 is provided with the conventional pulling finger as 76 on the inner end thereof which is adapted to operatively engage the ratchet teeth on the ratchet gear 75 and turn this shaft in a clockwise direction when the ratchet shaft 67 is moved outwardly.

It will be seen that the ratchet arms 71 and 72 rotate the ratchet gear 75 successively in a step by step motion so as to provide a means for moving the conveyor belt means 21 a distance equal to one length of the conveyor blocks each time that one of the ratchet arms functions. The driving connection between the ratchet gear 75 and the conveyor belt means 21 will be fully described hereinafter.

Figure 10:
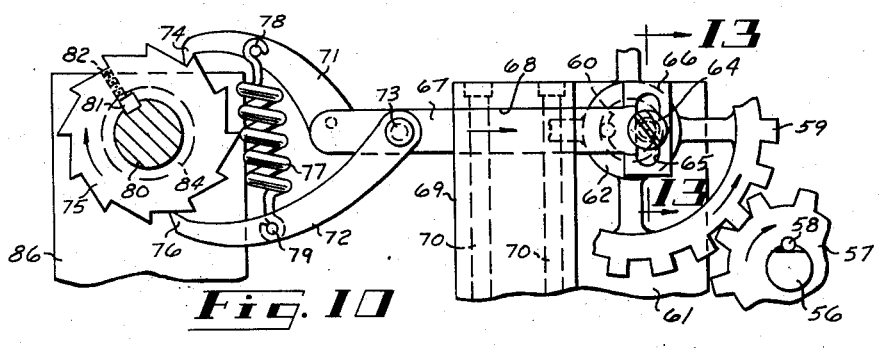
Fig. 10 is a fragmentary elevational view similar to Fig. 9, and showing the ratchet mechanism in a second operative position.

As seen in Figs. 9 and 10, the ratchet arms 71 and 72 are normally biased toward each other and into operative engagement with the ratchet gear 75 by means of the spring 77 which has one end operatively mounted on the ratchet arm 71 by means of the pin 78 and the other end thereof operatively mounted on the ratchet arm 72 by means of the pin 79.

Figure 5:
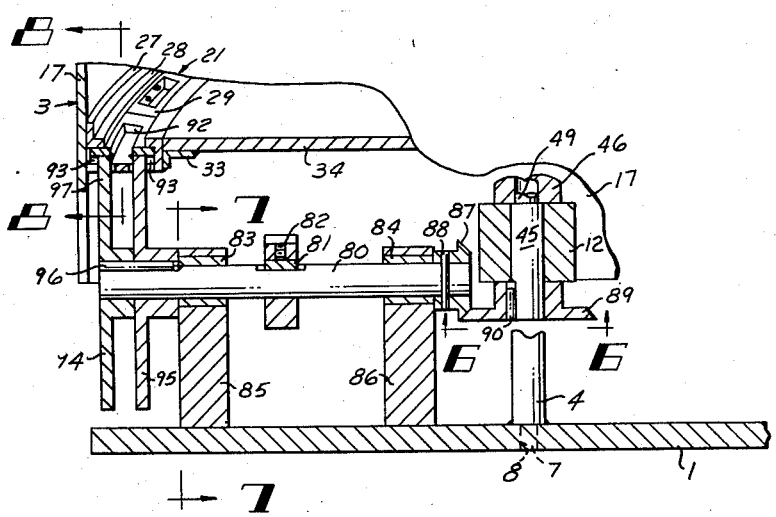
Fig. 5 is a fragmentary elevational sectional view of the structure illustrated in Fig. 1, taken along the line 5—5 thereof, and looking in the direction of the arrows.
Figure 7:
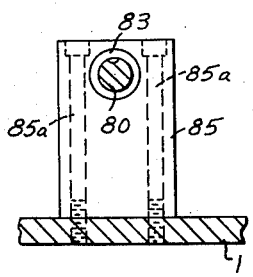
Fig. 7 is a fragmentary elevational view, partly in section, of the structure illustrated in Fig. 5, taken along the line 7—7 thereof, and looking in the direction of the arrows.

As best seen in Figs. 1, 5 and 9, the ratchet gear 75 is fixedly mounted on the horizontal shaft 80 by means of the lock key 81 and the setscrew 82. The horizontal shaft 80 is suitably journaled in the bearings 83 and 84 which are operatively mounted in the upper ends of the standards 85 and 86. The standards 85 and 86 are fixedly secured to the base plate 1 by suitable means as by means of the bolts 85a. Fixedly mounted on the inner end of the shaft 80 is the beveled gear 87. The gear 87 may be fixed on the shaft 80 by any suitable means as by the lock pin 88. The beveled gear 87 is adapted to mesh with and drive the beveled gear 89 which is fixedly secured by means of the lock pin 90 on the lower end of the shaft 45.

Figure 16:
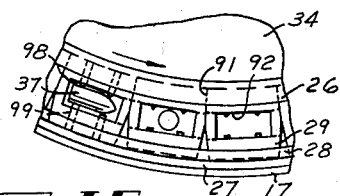
Fig. 16 is a fragmentary plan view of the structure illustrated in Fig. 15, taken along the line 16—16 thereof, and looking in the direction of the arrows.
Figure 18:
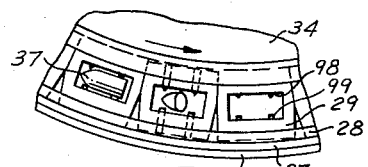
Fig. 18 is a fragmentary plan view of the structure illustrated in Fig. 17, taken along the line 18—18 thereof, and looking in the direction of the arrows.

As best seen in Figs. 1 and 16, the ends of the conveyor belt blocks 29 are adapted to abut each other and each of these blocks are provided with a pair of tapered end faces as 91. Each of the conveyor belt blocks 29 are provided with the rectangular slot 92 therethrough for the reception therein of a workpiece as 37. The slot 92 is formed in accordance with the shape of the workpiece desired to be fed by the hopper, as is more fully described hereinafter.

Figure 8:
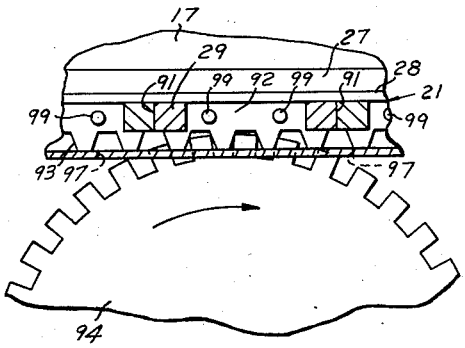
Fig. 8 is a fragmentary elevational view, partly in section, of the structure illustrated in Fig. 5, taken along the line 8—8 thereof, and looking in the direction of the arrows.
Figure 6:
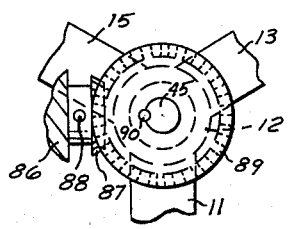
Fig. 6 is a fragmentary bottom plan view of the structure illustrated in Fig. 5, taken along the line 6—6 thereof, and looking in the direction of the arrows.

Each of the conveyor belt blocks is provided on the lower side thereof and along each side thereof with a longitudinally disposed set of gear locking teeth as 93 which are adapted to be meshably engaged by the spaced apart drive gears 94 and 95 which are fixedly mounted on the outer end of the shaft 80 by means of the lock pin 96, and this structure is best seen in Figs. 5 and 8. The gears 94 and 95 each extend through a suitable hole as 97 in the annular track plate 23. It will be seen that as the gears 94 and 95 are rotated they will actuate the conveyor belt blocks 29 around the conveyor track in a step by step motion.

As shown in Figs. 1, 8, 15 and 16, the slot 92 in each of the conveyor belt blocks 29 is substantially rectangularly formed and each of the conveyor belt blocks 29 is provided with a pair of pointed longitudinally spaced inwardly extended pins as 98. A pair of longitudinally spaced transversely disposed flat end pins 99 are mounted in each of the conveyor belt blocks 29 in positions opposite to the pointed pins 98. As is clearly seen, a workpiece 37 is pointed on one end thereof and this pointed end is adapted to pass between either one of a pair of oppositely disposed set of pins 98 and 99 but the opposite end will not pass between one of said pairs of pointed and flat ended pins. Because of the aforementioned relationship between the pointed end of the workpiece 37 and the pins 98 and 99, which may be termed locating pins, the workpiece 37 may be discharged through the discharge hole 100 which is formed in the conveyor track plate 23 in the following described manner.

Figure 15:
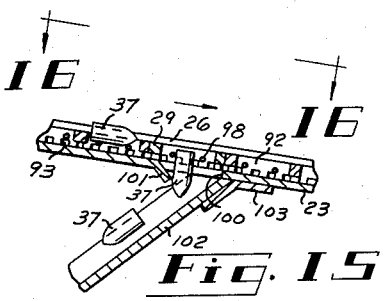
Fig. 15 is a fragmentary elevational sectional view of the structure illustrated in Fig. 1, taken along the line 15—15 thereof, looking in the direction of the arrows, and showing a first type workpiece being discharged from the hopper.

The discharge hole 100 as clearly seen in Fig. 1 is located at a point in the conveyor track just to the right of the high point of the track. The conveyor belt is adapted to be rotated in a counterclockwise direction, as viewed in Fig. 1 and the workpieces 37 are moved into a discharge position above the discharge hole 100 at a point just a few positions beyond the high point in the travel of the conveyor belt. As shown in Fig. 15, when the conveyor belt moves a workpiece as 37 to a point above the discharge hole 100, the pointed tapered end of the workpiece will slide through the locating pins 98 and 99 and tilt downwardly. The opposite end of the workpiece 37 pivots around the side of locking pins 98 and 99 on which it rested and the workpiece 37 will be discharged through the hole 100 with the pointed end facing downwardly. As seen in Fig. 15, the workpiece 37 is adapted to be discharged onto a sloping discharge chute 102 which is fixedly mounted to the underside of the conveyor plate 23 by means of the bracket 103. The bracket 103 may be fixedly secured to the chute 102 and the plate 23 by any suitable means as by welding. The discharge opening 100 is provided with a discharge lip or flange 101 on the entrance or approach end thereof for assisting the discharge of the workpiece 37 through the discharge hole 100.

In use the motor 55 would first be started and then a plurality of workpieces 37 would be deposited on the disc 34. The disc 34 will be agitated upwardly and downwardly in the manner described hereinbefore and the workpieces 37 will move down the sloping disc 34 and onto the conveyor belt means 21 at the low point or side of the conveying means. The conveyor belt blocks 29 will be moved counterclockwise as shown in Fig. 1 by means of the aforedescribed ratchet drive means and the workpieces 37 will be moved into the slots 92 in the conveyor belt blocks and will be moved around to the discharge hole 100 in the conveyor track plate 23. As each conveyor block 29 moves past the discharge slot 100 the pointed end of the workpiece 37 will tilt downwardly and the workpiece 37 will be discharged into the chute 102 in the aforedescribed manner.

Figure 17:
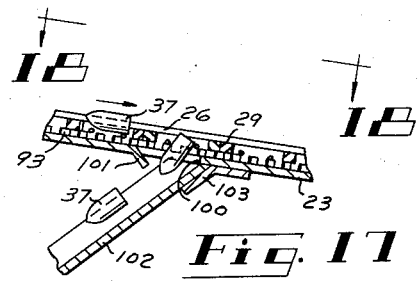
Fig. 17 is a fragmentary elevational sectional view identical to Fig. 15, and showing the first type workpiece as shown in Fig. 15 being discharged from the hopper when the workpiece is disposed in the hopper in a reversed position.

As shown in Figs. 15 through 18, it does not matter which way the workpieces 37 move or fall into the slots 92 in the conveyor belt blocks 29 since the pointed end will pivot downwardly first so as to have the workpiece 37 always move down the discharge chute 102 with the pointed end forward. Fig. 15 shows a workpiece 37 approaching the discharge hole 100 with the pointed end disposed forwardly and Fig. 17 shows a workpiece 37 approaching the discharge hole 100 with the pointed end disposed rearwardly. It will be clearly seen from these figures that no matter which way the pointed ends of the workpieces are disposed they will always be discharged onto the chute 102 with the pointed end disposed forwardly.

Figure 19:
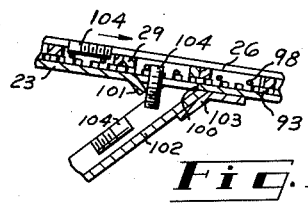
Fig. 19 is a fragmentary elevational sectional view similar to Fig. 15, and showing a second type workpiece being discharged from the hopper when the workpiece is disposed in a first position in the hopper.
Figure 20:
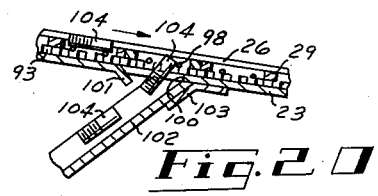
Fig. 20 is a fragmentary elevational sectional view identical to Fig. 19, and showing the second type workpiece of Fig. 19 being discharged from the hopper when it is disposed in a second position reversed to said first position.

As shown in Figs. 19 and 20, the conveyor belt blocks 29 having the locating pins 98 and 99 may be also adapted to orientate and feed the workpieces as 104 which are threaded on one end thereof so as to have the workpieces 104 always be discharged down the chute 102 with the threaded end facing forwardly. The threaded end of the workpiece or stud 104 is adapted to slide through each of the sets of oppositely disposed locating pins 98 and 99 but the unthreaded end of the stud 104 will not pass between either one of the opposed sets of pins 98 and 99. Accordingly, when the stud 104 approaches the discharge slot 100 in the conveyor track, the threaded end of the stud 104 will move downwardly and the stud will pivot about the other end thereof on the locating pin supporting the other end of the stud and the stud will be discharged onto the track 102 with the threaded end facing forwardly or downwardly. The stud 104 will be discharged with the threaded end first no matter which way it is picked up from the hopper, and this is shown by Figs. 19 and 20. In Fig. 19 the stud 104 is shown approaching the discharge slot 100 with the threaded end facing forwardly, and in Fig. 20, the stud 104 is shown as approaching the discharge slot 100 with the threaded end facing rearwardly. In both instances, the stud 104 will be discharged to the chute 102 with the threaded end facing forwardly.

Figure 22:
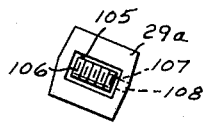
Fig. 22 is a fragmentary plan view of the structure illustrated in Fig. 21, taken along the line 22—22 thereof, and looking in the direction of the arrows.
Figure 21:
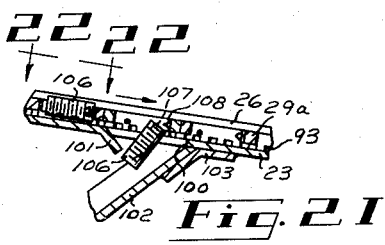
Fig. 21 is a fragmentary elevational sectional view similar to Fig. 15, and showing a modified feeder block for feeding a third type of workpiece.

The hopper feeder of the present invention is adapted to feed workpieces other than the type shown by numerals 37 and 104 and a further type of workpiece which may be orientated and discharged in a predetermined manner is shown in Figs. 21 and 22. The numeral 29a indicates a modified conveyor belt block having a rectangular slot 105 formed therethrough and in which a third type of workpiece as 106 is adapted to be carried. The workpiece 106 is a stud which is completely threaded and has an Allen-screw which is provided with the usual Allen-wrench hole 107 on one end thereof. As the conveyor belt blocks 29a are moved in the conveyor track the workpieces 106 will move from the disc 34 in the same manner as was described hereinbefore for the workpieces 37. However, the workpieces 106 will not move into the slot 105 unless they fall into this slot with the hole 107 disposed towards the end of the conveyor block 29a which has the pointed pin 108 mounted thereon. The pin 108 is pointed and extends inwardly into the slot 105 so as to engage the hole 107 in the end of the workpiece 106. If the workpiece 106 does not fall into the slot 105 in the manner shown in Fig. 22, then the conveyor belt block 29a just passes through the hopper and does not pick up any workpiece as it passes through the rotating position of the conveyor.

As shown in Fig. 21, as the conveyor belt means moves the conveyor blocks 29a over the discharge slot 100 the end of the workpiece which is not provided with a wrench hole will pivot downwardly by force of gravity and will fall into the discharge chute 102 with the head or end of the screw provided with the hole 107 facing upwardly or rearwardly. The conveyor belt blocks 29a are illustrated as being disposed with the locating pin 108 on the forward side, however, these conveyor blocks will function to feed the workpiece 106 down the discharge chute in the same relative position if the blocks 29a are reversed in position.

Figure 24:
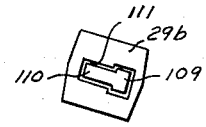
Figure 23:
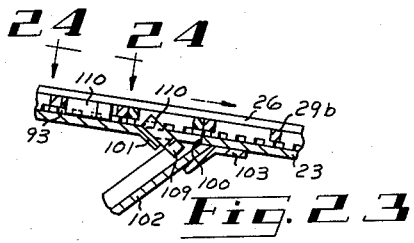
Fig. 23 is a fragmentary elevational sectional view similar to Fig. 15, and showing a further modified feeder block for feeding a fourth type of workpiece; and, Fig. 24 is a fragmentary plan view of the structure illustrated in Fig. 23, taken along the line 24—24 thereof, and looking in the direction of the arrows.

The hopper feeder means of the present invention may also be adapted to feed other types of workpieces in a predetermined or orientated position down the discharge chute, as for example, a workpiece which is heavier on one end than on the other. As shown in Figs. 23 and 24, a modified conveyor block means 29b is provided with a T-shaped slot therethrough as 111 in which is adapted to be disposed a T-shaped workpiece having a heavy end indicated by the numeral 109 and a light end indicated by the numeral 110. In this case, the conveyor blocks 29b are disposed in the conveyor track so as to have the heavy end of the workpiece 109 approach the discharge slot 100 in the conveyor track before the light end 110 approaches it. As is seen in Fig. 23, as the conveyor belt means moves the conveyor blocks 29b over the discharge slot 100 the heavy end 109 of the workpiece will pivot downwardly by gravity and the discharge slot 100 will coact with the workpiece so as to pivot it onto the discharge chute 102 with the heavy end 109 facing downwardly.

Figure 12:
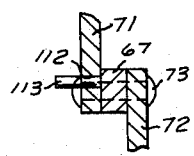
Fig. 12 is a fragmentary elevational sectional view of the structure illustrated in Fig. 9, taken along the line 12—12 thereof, and looking in the direction of the arrows.
Figure 14:
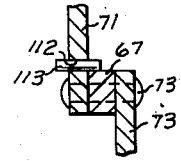
Fig. 14 is a fragmentary elevational sectional view of the structure illustrated in Fig. 11, taken along the line 14—14 thereof, and looking in the direction of the arrows.
Figure 11:
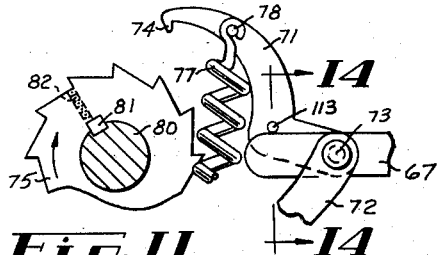
Fig. 11 is a fragmentary elevational view of the ratchet driving mechanism arranged for single driving action.

As shown in Figs. 11, 12 and 14, the ratchet driving mechanism may be modified for a single driving action whereby the ratchet drive gear 75 will only be actuated by the ratchet arm 72. The ratchet gear 75 will thus be operated once for each revolution of the drive gear 59. The aforedescribed single ratchet action may be provided by moving the ratchet arm 71 downwardly against the biased action of the spring 77 so as to move the ratchet arm 71 clear of the gear 75. The pin 113 which is slidably mounted in the hole 112 in the ratchet arm 71 may then be moved inwardly to the position shown in Fig. 14 whereby it will rest on top of the ratchet arm 67. In the aforedescribed position the ratchet arm 71 will be locked out of action and the ratchet arm 72 will be the only ratchet arm functioning.

Experience has shown that the hopper feeder of the present invention is well adapted to feed variously shaped workpieces down a discharge chute in predetermined positions and in an efficient manner. The ratchet drive mechanism functions not only to drive the conveyor belt means along the conveyor track but further functions to shake the workpieces out of the conveyor blocks when they reach the discharge slot 100.

It will be understood, that the base plate 1 may be mounted on any suitable table or support member which is adjustable to various heights, whereby the hopper feeder may be selectively disposed at any desired working height.

What I claim is:

1. An orienter of the class described, comprising: a base; a cylindrically shaped member fixedly mounted on said base and being open at the top and bottom ends thereof; an inclined circular track fixedly mounted on the inner surface of said cylindrically shaped member and having a bottom wall; a conveyor belt movably mounted on said track; an inclined disk mounted within said circular track and being adapted to have deposited thereon a random mass of workpieces; an agitating means for agitating said disk to cause the workpieces thereon to slide off of the disk and onto said conveyor belt; a gear rack formed on the bottom side of said conveyor belt; a hole formed in said track; a gear operatively mounted on said base and extending through said hole in said track and adapted to mesh with said gear rack for driving said conveyor belt on said track; a power drive means mounted on said base and being drivingly connected to said agitating means and said gear; and, a discharge chute adapted to receive the workpieces from said conveyor belt in a pre-determined oriented position.

2. The invention as defined in claim 1, wherein: said drive means includes, a shaft rotatably mounted on said base with said gear being fixedly mounted thereon; a ratchet drive wheel fixedly mounted on said shaft; a double action ratchet means mounted on said base and adapted for driving said ratchet wheel; a motor mounted on said base; and, a gear train operatively connected between said motor and said ratchet means.

3. The invention as defined in claim 2, wherein: said ratchet means includes a locking means adapted for holding a portion of said ratchet means in an inoperative position to provide a single driving action by said ratchet means.

4. An orienter of the class described, comprising: a base; a cylindrically shaped member fixedly mounted on said base and being open at the top and bottom ends thereof; an inclined circular track fixedly mounted on the inner surface of said cylindrically shaped member and having a bottom wall; a conveyor belt movably mounted on said track; an inclined disk mounted within said circular track and being adapted to have deposited thereon a random mass of workpieces; an agitating means for agitating said disk to cause the workpieces thereon to slide off of the disk and onto said conveyor belt; a gear rack formed on the bottom side of said conveyor belt; a hole formed in said track; a gear operatively mounted on said base and extending through said hole in said track and adapted to mesh with said gear rack for driving said conveyor belt on said track; a power drive means mounted on said base and being drivingly connected to said agitating means and said gear; said conveyor belt being provided with a plurality of slots formed therethrough which are each adapted to receive a workpiece from said disk; a discharge slot formed in said track bottom wall and adapted to coact with the slots in said belt to permit the workpieces in the slots in said belt to pass downwardly through said discharge slot; and, a discharge chute adapted to receive the workpieces discharged through said discharge slot from said conveyor belt in a pre-determined oriented position.

5. The invention as defined in claim 4, wherein: said discharge slot is provided with a sloping flange along the leading edge thereof.

6. The invention as defined in claim 4, wherein: said conveyor belt comprises a plurality of separate members which are each provided with one of said slots in said belt; and, said drive means includes a ratchet means operatively connected to said gear and being adapted to actuate said gear so as to move said conveyor belt in a step-by-step manner so as to successively move said separate members in alignment with said discharge slot.

7. The invention as defined in claim 6, wherein: said slots in said separate belt members are formed so as to conform to the shape of the workpiece.

8. The invention as defined in claim 6, wherein: said slots in said separate belt members are rectangularly shaped; and, a pivot means is provided in each of last named slots for orienting the workpieces when they are discharged from said belt members.

9. The invention as defined in claim 6, wherein: said agitating means includes a cam fixedly mounted on the lower side of said disk; and, a plurality of cam arms rotatably mounted beneath said disk and adapted to operatively engage said cam in a successive manner.

10. An orienter of the class described, comprising: a base; a cylindrically shaped member fixedly mounted on said base and being open at the top and bottom ends thereof; a sloping circular conveyor means operatively mounted on the inner surface of said cylindrically shaped member; a sloping disk mounted within said circular conveyor means; said disk being adapted to receive a random mass of workpieces; means for agitating said disk to cause the workpieces thereon to slide off of the disk onto the conveyor means; a power drive means mounted on said base and being drivingly connected to said conveyor means and said agitating means; a discharge chute adapted to receive the workpieces from said conveyor means in a pre-determined oriented position; said conveyor means including, a circular track having a bottom wall; a conveyor belt movably mounted on said track and having a plurality of slots formed therethrough which are each adapted to receive a workpiece from said disk; a discharge slot formed in said track bottom wall adapted to coact with said belt to discharge the workpieces from said belt and onto said chute; and, said conveyor belt including at least one locating pin means adapted to extend into each slot formed in said belt and constructed to engage a workpiece in the slot and function as a pivot means for orienting the workpiece when it is discharged through said discharge slot.

11. The invention as defined in claim 10, wherein: said locating pin means includes one longitudinally disposed pin extended into each of the slots in said belt at one end of the slots.

12. The invention as defined in claim 10, wherein: said locating pin means includes a pair of transversely disposed pins extended into each of the slots in said belt from opposite sides thereof and in alignment with each other.

13. An orienter of the class described, comprising: a base; a cylindrically shaped member fixedly mounted on said base and being open at the top and bottom ends thereof; a sloping circular conveyor means operatively mounted on the inner surface of said cylindrically shaped member; a sloping disk mounted within said circular conveyor means; said disk being adapted to receive a random mass of workpieces; means for agitating said disk to cause the workpieces thereon to slide off of the disk onto the conveyor means; a power drive means mounted on said base and being drivingly connected to said conveyor means and said agitating means; a discharge chute adapted to receive the workpieces from said conveyor means in a pre-determined oriented position; said conveyor means including, a circular track having a bottom wall; a conveyor belt movably mounted on said track and having a plurality of slots formed therethrough which are each adapted to receive a workpiece from said disk; a discharge slot formed in said track bottom wall adapted to coact with said belt to discharge the workpieces from said belt and onto said chute; the slots formed in said conveyor belt being shaped in conformance with the workpieces to be received therein; and, the ends of these slots having the greatest cross section area being disposed so as to be the leading ends of these slots relative to the direction of movement of said belt.

14. An orienter of the class described, comprising: a base; a cylindrically shaped member fixedly mounted on said base and being open at the top and bottom ends thereof; a sloping circular conveyor means operatively mounted on the inner surface of said cylindrically shaped member; a sloping disk mounted within said circular conveyor means; said disk being adapted to receive a random mass of workpieces; means for agitating said disk to cause the workpieces thereon to slide off of the disk onto the conveyor means; a power drive means mounted on said base and being drivingly connected to said conveyor means and said agitating means; a discharge chute adapted to receive the workpieces from said conveyor means in a pre-determined oriented position; said conveyor means including, a circular track having a bottom wall; a conveyor belt movably mounted on said track and having a plurality of slots formed therethrough which are each adapted to receive a workpiece from said disk; a discharge slot formed in said track bottom wall adapted to coact with said belt to discharge the workpieces from said belt and onto said chute; and, said conveyor belt comprising a plurality of blocks disposed in an end-to-end relationship with each of said blocks having a workpiece receiving slot formed therethrough.

References Cited in the file of this patent

UNITED STATES PATENTS

| | | |
|---|---|---|
| 1,311,256 | Wilcox | July 29, 1919 |
| 1,558,079 | Duston | Oct. 20, 1925 |
| 2,369,529 | Buckholdt | Feb. 13, 1945 |
| 2,594,337 | Noe | Apr. 29, 1952 |
| 2,642,173 | Wehmiller | June 16, 1953 |
| 2,679,176 | Bruckman | May 25, 1954 |
| 2,728,442 | Whitecar | Dec. 27, 1955 |